G. LITTLE.
CHEMICAL TELEGRAPH.
No. 108,496.  Patented Oct. 18, 1870.
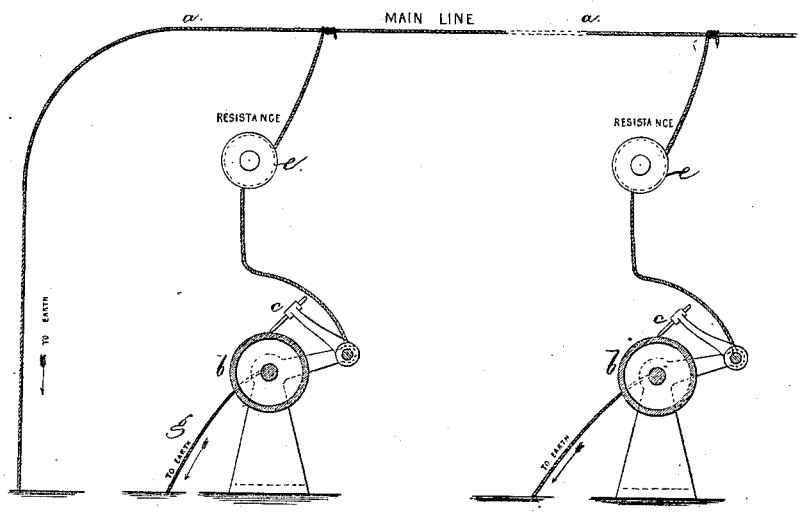

United States Patent Office.

GEORGE LITTLE, OF RUTHERFORD PARK, NEW JERSEY.

Letters Patent No. 108,496, dated October 18, 1870.

IMPROVEMENT IN CHEMICAL TELEGRAPHS.

The Schedule referred to in these Letters Patent and making part of the same.

*To all whom it may concern:*

Be it known that I, GEORGE LITTLE, of Rutherford Park, in the county of Bergen and State of New Jersey, have invented an Improvement in Circuits for Chemical Telegraphs; and the following is declared to be a correct description thereof.

Chemical telegraphs, in which the mark is made on a strip or surface of paper by a stilus, have usually only been worked at the end of a main line, because provision had not been made whereby "drop copies," or several copies could be made on one main line. Recently derived circuits or shunts have been employed in the line-wire of the main circuit for effecting this object.

My improvement, as distinguished from the devices which have preceded it, relates to an arrangement for diverting a portion of the main current, employing the same for giving the mark in the chemical paper, and returning the same through the earth circuit, while the other portion of the current proceeds to the distant station. By this means the main circuit is subdivided, and the current passes off by leakages, or in detail, sufficient to make the mark on the chemical paper, and only so much of the current is employed as is necessary, where each copy is taken, and the remainder returns by the earth-circuit.

In the drawing I have represented a diagram illustrative of the improvement.

The wire $a$ represents the main line from one station to another.

$b$ represents the roller, and $c$ the stilus of any chemical telegraph, which, being well known, requires no further description.

The roller and stilus, at each station where a drop copy is to be taken, are in a branch or leakage-circuit between the main line $a$ and the ground.

The pulsations of electricity from the sending station will pass through a short circuit in preference to a long circuit, if the conducting power is uniform; hence, if several chemical telegraphs were connected with the main line, without a resistance or rheostat between the instrument and the main line, the pulsations would pass almost, if not exclusively, through the first instrument, to avoid which a resistance is to be introduced, as at $e$, between each instrument and the main line, and this resistance is to be proportioned by any of the well-known adjustable methods, so that only the amount of galvanic electricity necessary to make the mark is allowed to pass or leak from the main circuit to make the drop copy at the desired stations, the other portion of the current proceeding to the distant station, and, at the last station, any surplus electricity may pass to the earth by the connection shown at $g$.

The resistance may be a coil, a column of mercury, or any other device that is adapted to the purpose, and I prefer to employ a resistance that is adjustable or variable, so as to proportion the resistance to the current.

By the use of several branch or leakage-circuits, connected to the earth, the main line is cleared of surplus electricity with much greater rapidity than in the arrangements heretofore employed; and hence, the mark on the chemical paper will be more distinct, and, in cases where desired, a resistance and leakage-circuit to the earth may be employed to clear the wire, even when a chemical recording instrument is not employed.

I claim as my invention—

1. A branch-circuit connected with the main line and the earth, in which is placed the chemical telegraph and a resistance between that and the main line, substantially as and for the purposes set forth.

2. A branch-circuit and resistance, connected from the main line to the earth, for clearing the wire of surplus electricity, substantially as set forth.

Signed by me this 26th day of August, A. D. 1870.

GEORGE LITTLE.

Witnesses:
CHAS. H. SMITH,
GEO. T. PINCKNEY.